3,330,891
RETREADING OF TIRES

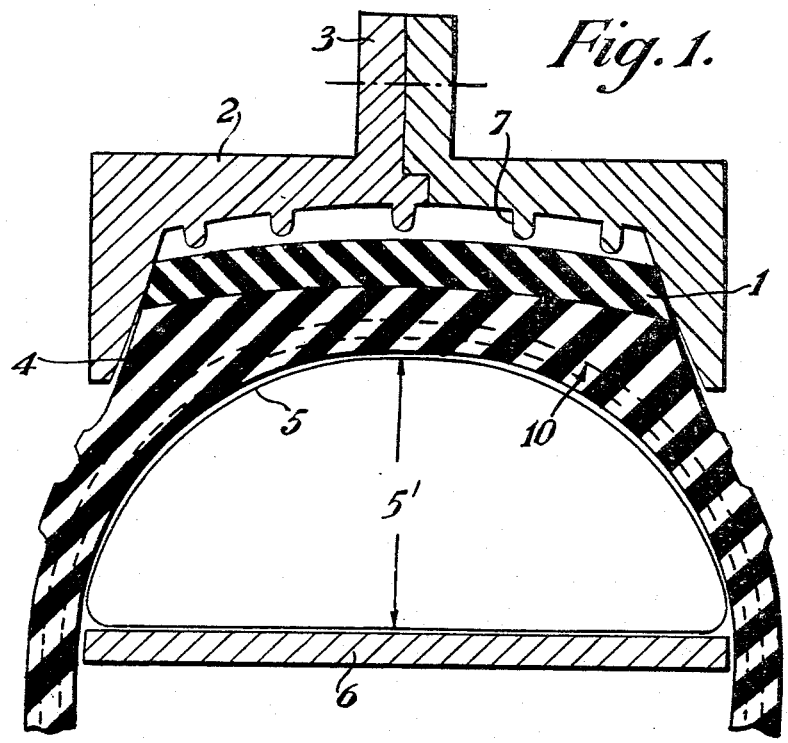
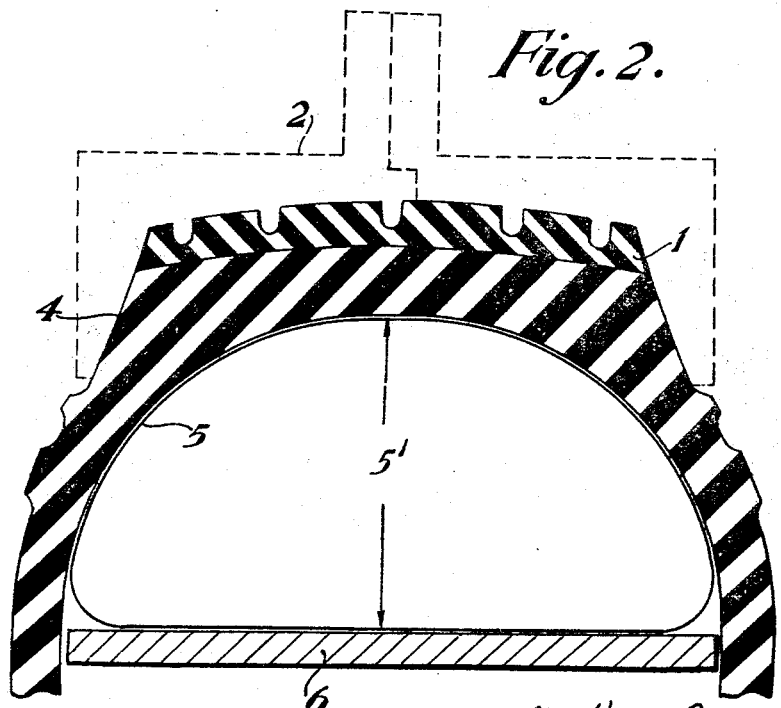

Jan Herbert Farquharson Kent, St. Martin, Jersey, Channel Islands, assignor to Kentredder Limited, St. Helier, Jersey, Channel Islands, a corporation of Jersey, Channel Islands
Filed Feb. 24, 1964, Ser. No. 346,739
1 Claim. (Cl. 264—36)

This invention relates to an improved method of retreading tires.

In the specification of my prior British Patent No. 732,241, there is described a method of retreading tires in which, instead of applying the new tread band to the tire, an unvulcanised strip of rubber constituting the new tread is first placed in the matrix, following which the outer cover of the tire is superimposed on the strip, the cover being contracted by pressure applied to the beads to force them apart until the contraction is sufficient to enable the cover to be introduced into the matrix.

There is an increasing demand for tires of the type having a "rigid breaker," that is, in which the reinforcement of the tire carcass is built up wholly or partially of steel wires or nylon thread members, which are relatively inextensible compared with the textile threads used in conventional tires. This results in a tire, which is highly resistant to extension or compression along the line of its circumference.

It follows therefore that, because an outstanding characteristic of the rigid breaker type of tire is that it has virtually no circumferential stretch whatsoever, when the tire has been buffed and subsequently has to be built up with new rubber in a conventional manner, as described in British specification No. 732,241, it cannot be inserted into a circular mould of the correct diameter without causing a crinkle to form in it. When the tire is inflated, or pressed out by other means against the mould, the act of straightening out the crinkle disrupts the new unvulcanised tread rubber and thereby upsets its distribution.

This difficulty can be met by building the new tread onto the tire, but this is not satisfactory mainly for the reason that the equipment is complicated, involving the use of a mould, which is segmental to enable it to be contracted onto the tire.

According to the present invention a method of retreading a tire of the rigid breaker type comprises the steps of:

(i) Placing an unvulcanised tread band strip in the matrix (ii) Applying pressure to the strip uniformly around its internal perimeter so that it is engaged with the tread pattern or contour of the matrix and (iii) Then inserting the outer cover, which has been prepared to a predetermined size and contour, in the usual manner, in the matrix and superimposing it on the tread band strip.

In order to apply the necessary pressure uniformly throughout the surface of the rubber strip as it sinks into the pattern of the matrix (and consequently increase its circumference as it does so) some extensible means must be employed and a degree of rigidity is also required if signs of the tread pattern of the mould are not be retained on the inner surface of the compound after the pressure operation. The elimination of any impression of the tread pattern on this surface is important, for, if it is retained, there will be a tendency to trap air between the new rubber and the buffed surface of the tire to be retreaded and this tends to spoil the bond.

The invention is illustrated in the accompanying drawings in which:

FIGURE 1 is a sectional view showing the mould in which has been inserted a strip of rubber to form the new tread band together with a sinker device including a contractile tire cover, an inflatable bag and ring for positioning the new tread strip in the mould.

FIGURE 2 is a sectional view corresponding to FIGURE 1 but showing the tread strip after it has been forced into position in the base wall of the mould and prior to removal of the sinker device.

Referring to the drawings, in carrying out the retreading operation of this invention, a strip 1 of unvulcanised rubber constituting the new tread band is positioned within a two-part circular mould or matrix 2, the two parts of the mould having complementary circumferential flanges 3, by which they are detachably secured to one another by studs or bolts (not shown) to permit of removal of the tire following the retreading operation which tire, as explained above, is relatively inextensible by reason of the nature of the reinforcement. As shown in the drawings, the mould matrix is symmetrical with respect to a central plane containing the abutting faces of the flanges 3. The strip 1 of tread band material is substantially wider transversely to that plane than it is thick radially of the matrix. When the strip 1 is inserted into the matrix, the strip extends substantially equally to both sides of the aforementioned plane.

An expandable member 10 termed the sinker and consisting of a conventional smooth surfaced tire casing or carcass of the same size as that for which the mould is designed, is then used as the sinking means to force the tread band 1 into position where it lies against the perimeter of the mould. The sinker is introduced in the usual manner which consists in spreading the walls apart until there is sufficient contraction at the tread to enable it to be inserted into the mould, following which it is allowed to expand and thus perform its operation as a sinker to apply pressure to the tread band and force it into engagement with the mould.

A worn textile tire can be used for the sinker, the tire, i.e., the outer cover, if necessary, being modified by cutting away the beads and part of the walls, as indicated at 4, to fit the mould.

The sinker 10 having been inserted inside the mould an inflatable air bag 5 is placed inside the sinker together with an annular plate 6.

It is now possible, by inflating the air bag 5, to exert sufficient pressure through the sinker 10 to ensure that the strip 1 is applied uniformly throughout its entire perimeter against the bottom of the mould. Because of its rigidity, the sinker will ensure that no impression of the mould pattern, i.e., the projection 7, will appear on the reverse side of the tread band 1. On completion of this operation the air bag 5 is deflated and the sinker and ring 6 removed.

The procedure for retreading a "rigid breaker" tire can be summed up as follows:

(1) Place the outer cover to be retreaded on the spreader and buff it to the correct size and contour.

(2) Place the new unvulcanised tread strip into the matrix or mould so that it rests on the projections forming the tread pattern in the mould.

(3) Place the tread sinker over the tread strip.

(4) Insert a pressure bag and a support rim inside the tread sinker and inflate the bag. (At this point, the mould may also be warmed to assist the new rubber being completely pressed home into the interstices of the mould).

(5) Deflate the bag and remove it together with the support rim and sinker.

(6) Insert the outer cover and proceed in the usual way. As the tire has been buffed to the correct size and the unvulcanised tread strip has been completely forced into the tread pattern, only a fractional movement is needed to obtain the necessary pressure between the surface to be bonded to one another.

What is claimed is:

In a method of retreading a rigid breaker tire having reinforcement members which are relatively inextensible compared with textile threads used as reinforcement in conventional tires, which rigid breaker tire is highly resistant to extension and compression along its circumference, the steps of:

(a) inserting into a circumferential matrix having a tread pattern a strip of tread band material to form the new tread, said matrix being symmetrical with respect to a central plane, and said strip of tread band material being substantially wider transversely to said plane than it is thick radially of said matrix and, when inserted into said matrix, extending transversely substantially equally to both sides of said plane;

(b) inserting into the matrix the carcass of a conventional breaker tire of substantially the same size as the rigid breaker tire to be retreaded, said conventional breaker tire carcass having a smooth peripheral outer surface and being relatively extensible along its circumference as compared to the rigid breaker tire to be retreaded;

(c) applying pressure to the inside of said carcass to expand the latter into forceful contact with said strip of tread material and thereby to force said strip into intimate forceful contact with the inside of said matrix, said carcass having sufficient rigidity to ensure that no impression of the matrix pattern will be formed on the inside of said strip of tread band material when said carcass has been expanded and then removed from said matrix;

(d) removing said relatively circumferentially extensible carcass from said matrix;

(e) inserting the rigid breaker tire to be retreaded into said matrix and circumferentially within said strip of tread band material in said matrix; and (f) vulcanizing said strip of tread material to said rigid breaker tire.

References Cited

UNITED STATES PATENTS 2,110,293   3/1938   Fischer.
2,497,226   2/1950   McNeill _____ 264—326 XR

FOREIGN PATENTS 899,702   6/1962   Great Britain.

ROBERT F. WHITE, *Primary Examiner.*

T. J. CARVIS, *Assistant Examiner.*